US011339317B1

(12) United States Patent
Gallo et al.

(10) Patent No.: US 11,339,317 B1
(45) Date of Patent: May 24, 2022

(54) METHOD OF DRILLING A WELLBORE

(71) Applicant: LAMBERTI SPA, Albizzate (IT)

(72) Inventors: Erik Gallo, Mottalciata (IT); Lorena Bottarello, Solbiate Arno (IT); Luigi Merli, Saronno (IT); Pierangelo Pirovano, Comerio (IT); Massimo Cecchetto, Oggiona con Santo Stefano (IT); Laura Vigano', Parabiago (IT); Giovanni Floridi, Novara (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 0 days.

(21) Appl. No.: 17/420,774

(22) PCT Filed: Jan. 13, 2020

(86) PCT No.: PCT/EP2020/050713
§ 371 (c)(1),
(2) Date: Jul. 6, 2021

(87) PCT Pub. No.: WO2020/148235
PCT Pub. Date: Jul. 23, 2020

(30) Foreign Application Priority Data

Jan. 14, 2019 (IT) .................. 102019000000585

(51) Int. Cl.
*C09K 8/34* (2006.01)
(52) U.S. Cl.
CPC ..................... *C09K 8/34* (2013.01)

(58) Field of Classification Search
CPC ...... C09K 8/36; C09K 8/035; C09K 2208/34; C09K 8/32; C09K 2208/32; C09K 2208/28; C09K 8/00; C09K 8/502; C09K 8/34
See application file for complete search history.

(56) References Cited

U.S. PATENT DOCUMENTS

| 2,191,033 | A |   | 2/1940  | Faw et al. |
| 2,793,189 | A | * | 5/1957  | Schuessler ............... C09K 8/36 507/128 |
| 3,252,903 | A | * | 5/1966  | Crittendon ............... C09K 8/36 507/117 |
| 4,356,096 | A |   | 10/1982 | Cowan et al. |

FOREIGN PATENT DOCUMENTS

| GB | 1236140 A    | 6/1971 |
| WO | 2020148235 A1 | 7/2020 |

OTHER PUBLICATIONS

Written Opinion of the international Search Authority for PCT/EP2020/050713 dated Mar. 23, 2020.
International Search Report for PCT/EP2020/050713 dated Mar. 23, 2020.

* cited by examiner

*Primary Examiner* — Kumar R Bhushan
(74) *Attorney, Agent, or Firm* — Vorys, Sater, Seymour and Pease LLP; Iona Niven Kaiser

(57) ABSTRACT

A method of minimizing the weight loss of mass of the drilling pipe and wellbore casing while drilling a subterranean well with an oil-based drilling fluid comprising adding to the oil-based drilling fluid an anti-wear additive based on sulfated, sulfonated or sulfited natural oils or fats of vegetable or animal origin.

7 Claims, No Drawings

METHOD OF DRILLING A WELLBORE

CROSS REFERENCE TO RELATED APPLICATIONS

This application is the U.S. national phase of PCT Application No. PCT/EP2020/050713 filed on Jan. 13, 2020, which claims priority to Italian patent application number 102019000000585 filed on Jan. 14, 2019, the contents of both applications are hereby expressly incorporated by reference herein.

TECHNICAL FIELD

The present invention relates to a method of minimizing the weight loss of mass of the drilling pipe and wellbore casing while drilling a subterranean well with an oil-based drilling fluid comprising the use of an oil-based drilling fluid containing sulfated, sulfonated or sulfited natural oils or fats of vegetable and animal origin, or mixtures thereof, as anti-wear agents.

BACKGROUND OF THE ART

Wellbore fluids are used during drilling operations for exploration or extraction of gas or oil from subterranean formations.

These drilling fluids perform a number of functions, such as: (i) carrying drill cuttings up to the surface and suspending them when the fluid circulation is stopped; (ii) creating a filter cake on the bore hole walls to reduce permeability; (iii) cooling and lubricating the drill bit; (iv) creating hydrostatic pressure to avoid uncontrolled blow outs; (v) to help supporting the weight of the bore hole walls; and (vi) acting as lubricant between the drill bit, the drill string and the borehole walls.

These fluids may be classified according to their fluid base. Water-based fluids contain solid particles suspended in water or brine. Alternatively, oil-based fluids, also referred to as oil-based-muds, contain solid particles suspended in an inverted emulsion. Oil-based-muds have the oil phase as the continuous phase and a fluid at least partially immiscible in the oil phase (usually a brine) as the discontinuous phase.

For this reason, oil-based-muds may be also referred to as invert emulsions.

Invert emulsions are preferred as drilling fluids when the formation is remarkably sensitive to contact with water and they have usually a better thermal resistance and guarantee better lubrication of the drill strings and downhole tools. Furthermore, they form a thinner filter cake and may provide improved hole stability.

The specialized machinery employed in oil and gas drilling and exploration, for both onshore and offshore projects, work under extreme pressure conditions, enduring high loads and temperatures. As the drill string rotates, the drill pipe and more particularly the larger outside diameter portion of the tool joints may rub against the interior wall of the casing. Inevitably, continuous friction causes wear of essential mechanical parts and thus tools deterioration, leading to drilling inefficiencies, due to increased power needed to overcome frictional resistance, decline in machine performance and life of equipment, decreased reliability, delay in operations, shorter service cycles and higher maintenance requirements. This is particularly significant for drilling tools used in complex drilling operations characterized by demanding tribological conditions. Horizontal directional drilling (HDD) or, more in general, drilling operations involving non-vertical wells are examples of these complex drilling operations.

In such situations, which may yield to a heavy wear of the drilling pipe and wellbore casing, it is mandatory to add to the drilling fluids, in particular to oil-based fluids, at least one efficient anti-wear agent.

Anti-wear agents form a protective layer which prevent metal-to-metal contact by physical or chemical adsorption on the surfaces.

A large number of anti-wear agents has been developed in various fields, in particular for hydraulic and automotive engines.

These anti-wear agents are mainly organic substances containing sulfur and/or phosphorus etheroatoms, such as thiophosphates and thiophosphonates, metal-dialkylphosphonates, metal-dithiophosphates, in particular zinc dithiophosphate (ZDP), phosphoramidates, phosphonated amines, amido- and amino-thiophosphates, metal dithiocarbamates, organosulphides, xanthates, sulfurized olefins, sulfurized fats or esters, S-containing heterocyclics, organoboron compounds, N-based heterocyclic compounds, benzotriazole derivatives, alkylthiomethylbenzotriazole, fullerenes and halogen-containing additives.

However, these anti-wear agents have some drawbacks and deficiencies.

Due to the competition for the metal surface of lubricants and anti-wear agents, it is always necessary to identify compounds that improve the anti-wearing performance without negatively affecting the lubricant performance of the fluid.

Furthermore fluids for drilling operations must have their specific and well-defined characteristics. Thus, all additives, including the anti-wear agents, should not modify the rheology and the fluid loss behaviour of the drilling fluids, both in low or, in particular, in high temperature working conditions. Additionally, complex drilling operations are often carried out off-shore and thus it would be advantageous, from an environmental point of view, to use agents with good biodegradability in seawater (>60% according to the biodegradability test OECD 306) and/or agents classified as "Yellow", Subcategory 1, according to the Norwegian classification scheme.

For these reasons, there is still the need in the art of finding new efficient anti-wear agents, which allow to overcome the above-described problems. Now, we have surprisingly found that sulfated, sulfonated or sulfited natural oils and fats of vegetable or animal origin and mixtures thereof, when added to oil-based drilling fluids act as anti wear-agents surprisingly effective in minimizing the loss of mass of the drilling pipe and wellbore casing. At the same time, they preserve or even improve the rheology, lubricity and fluid loss of the drilling fluids. Moreover, they do not affect the ecotoxicological profile of said oil-based drilling fluid.

Sulfurized natural oils or fats, containing C—$S_n$—C bridges, are not included in the definition sulfated, sulfonated or sulfited natural oils and fats. Sulfated, sulfonated or sulfited natural oils and fats of vegetable and animal origin and mixtures thereof are well known in the art as lubricant in water-based drilling fluids.

For example, U.S. Pat. No. 3,671,410 provides water based drilling fluids having enhanced lubricating properties comprising a water insoluble alcohol and a material selected among vegetable oils, animal fats, fatty acids, fatty acid esters, their sulfurized or sulfated derivatives, and mixtures thereof.

U.S. Pat. No. 4,356,096 discloses a method of reducing the torque required to rotate the drill string which comprises adding to the drilling fluid a liquid organic lubricant and a hydrophobic, organophilic, water wettable sorbent. The liquid organic lubricant is chosen in a group comprising, among the others, sulfated vegetable oils and sulfated animal fats.

US 2010/016180 provides a method of increasing the lubricity or reducing the coefficient of friction of a drilling or completion fluid containing a brine by adding to the brine an anionic or non-ionic surfactant and at least one water-soluble or water-dispersible salt of a sulfonated (sulfated) vegetable oil or derivative thereof.

US 2012/157353 describes a water-based drilling fluid containing a lubricant. The preferred lubricant is a sulfurized vegetable oil, such as a sulfonated vegetable oil.

WO 2015/002726 discloses an aqueous-based drilling fluid comprising a lubricant. The lubricant includes a clay stabilizer and a vegetable oil derivative, such as a sulfonated vegetable oil.

CN 103773329 discloses a high-temperature-resistant lubricating agent, comprising 20-60 parts of vegetable oil, 30-70 parts of sulfonated bitumen and 0-30 parts of sulfonated vegetable oil by mass. The high-temperature-resistant lubricating agent considerably improves the lubricating properties of water-based drilling fluids.

CN 105368413 discloses an anti-wear anti-seize lubricant for water-based drilling fluids, comprising: epoxidized (and/or sulfonated) modified vegetable oil, at least two organic boric acid esters with different carbon chains, triethylamine, samarium dialkylphosphorodithiloate, (+)-2,2'-methylenebis[(3aR,8aS)-3a,8a-dihydro-8H-indeno[1,2-d]oxazole, and an emulsifier.

As far as the Applicant knows, the use of sulfated, sulfonated or sulfited natural oils or fats of vegetable and animal origin as anti-wear agents in oil-based drilling fluid has never been described before.

Unless otherwise specified, the percent weight/volume is expressed in gram/100 ml, equivalent to 3.5 pound/barrel.

DESCRIPTION OF THE INVENTION

It is, therefore, an object of the present invention a method of minimizing the weight loss of mass of the drilling pipe and wellbore casing while drilling a subterranean well with an oil-based drilling fluid, said method comprising: i) preparing an oil-based drilling fluid containing an external oil phase, an internal aqueous phase and an emulsifier; ii) thereafter, adding to the oil-based drilling fluid an anti-wear additive comprising:
a) from 25 to 75 wt % of sulfated, sulfonated or sulfited natural oils or fats of vegetable or animal origin, or mixtures thereof;
b) from 20 to 70 wt % of a solvent;
c) from 1 to 50 wt % of non-ionic or ionic surfactants;
the amount of the anti-wear additive being such that the final oil-based drilling fluid contains between 0.1 and 4.0 g/100 ml of said sulfated, sulfonated or sulfited natural oils or fats of vegetable or animal origin and mixtures thereof based on the total fluid volume.

The present invention also relates to an anti-wear additive comprising:
a) from to 25 to 65% by weight (wt %), preferably from 30 to 60 wt %, of one or more sulfated, sulfonated or sulfited natural oils or fats of vegetable or animal origin, or mixtures thereof;
b) from 20 to 70 wt %, preferably from 30 to 60 wt %, of one or more solvents;
c) from 1 to 50 wt %, preferably from 1 to 25 wt %, of one or more non-ionic or anionic surfactants or mixture thereof.

DETAILED DESCRIPTION OF THE INVENTION

Preferably, the amount of the anti-wear additive is such that the final oil-based drilling fluid contains between 0.25 and 3.0 w/v % of said sulfated, sulfonated or sulfited natural oils or fats based on the total fluid volume. More preferably, the amount of the anti-wear additive is such that the final oil-based drilling fluid contains between 0.5 and 2.5 w/v % of said sulfated, sulfonated or sulfited natural oils or fats based on the total fluid volume.

The preferred sulfated, sulfonated or sulfited natural oils or fats have an organic $SO_3$ content between 0.5 and 4.5% by weight, preferably between 1.5% and 2.5% by weight, determined according to ASTM D1681-05. Furthermore, the inorganic sulfate/sulfite content is preferably less than 2% by weight.

The sulfated, sulfonated or sulfited natural oils or fats of the invention can be obtained using any process described in the art of sulfation, sulfonation and sulfitation of natural oils or fats of vegetable or animal origin.

Briefly, the sulfated or sulfonated natural oils of the invention can be prepared by treating natural oils or fats of vegetable or animal origin with sulfuric acid and removing the excess of acid using a wash liquid or water. This process is described, for example, in U.S. Pat. No. 1,081,775, in "Sulfonation and sulfation of oils", Trask, R. H., J. Am. Oil Chem. Soc., 33(11), 568-571 (1956); in "Gli oli solfonati", M. Diena, Editoriale Italiana, Milano, p. 39-54 (1949).

Sulfited natural oils or fats can be prepared by oxidation of fats or oils with oxygen and simultaneous or subsequent sulfitation using alkali/ammonium sulfites and/or hydrogen sulfites or with sulphur trioxide, as described, for example in U.S. Pat. No. 4,903,362. The reaction of oxidized oils or fats with $NaHSO_3$ or $Na_2S_2O_5$ is also described in U.S. Pat. No. 5,529,704.

Castor oil, corn oil, cottonseed oil, olive oil, palm oil, peanut oil, rapeseed oil, safflower oil, sesame oil, soybean oil, sunflower oil, regenerated waste oil and tung oil are examples of vegetable oils suitable for the preparation of the sulfated, sulfonated or sulfited natural oils and fats of vegetable origin of the invention.

Suitable fats and oils of animal origin are cattle fat, buffalo fat, sheep fat, goat fat, pig fat, poultry fat, camel fat, fat of other camelids, lard, fish oil, whale oil, cod-liver oil, herring oil, salmon oil, sardine oil, jap fish oil, menhaden oil, sperm oil, beef tallow, mutton tallow, wool fat and grease, neatsfoot oil.

The regenerated waste animal or vegetable oils or fats are also suitable for the realization of the present invention.

Preferred natural oil or fats are regenerated waste oil oils, fish oil, sperm oil, soybean oil, rapeseed oil, fish oil and tall oil.

Additional information concerning the processes for the preparation of the sulfated, sulfonated or sulfited natural oils or fats of the invention can be found in "Gli oli solfonati" M. Diena, Editoriale Italiana, Milano, (1949) and in "Tecnologia Chimica Industriale degli oli, grassi e derivati", G. B. Martinenghi, 3th Ed., Hoepli, 904-917 (1963).

Preferred oils are sulfited or sulfated natural oils and fats of vegetable or animal origin and mixtures thereof.

Sulfited fish oil, sulfited sperm oil, sulfited or sulfated soybean oil, sulfited or sulfated regenerated waste oils and fats, sulfited or sulfated rapeseed oil and mixtures thereof being the most preferred.

The concentration of the oil phase and of the emulsifier in the oil-based drilling fluids of the invention shall be sufficient to form a stable invert emulsion.

In an embodiment of the invention, the amount of oil phase is from about 30 to about 95 vol. %, preferably from about 50 to about 90 vol. % based on the total volume of the fluid.

The oil phase used in the invert emulsions of the present invention may comprise any oil-based fluid suitable for use in emulsions.

The oil phase may derive from a natural or synthetic source. Examples of suitable oil phase include, without limitation, diesel oils, paraffin oils, mineral oils, low toxicity mineral oils, olefins, esters, amides, amines, synthetic oils such as polyolefins, ethers, acetals, dialkyl carbonates, hydrocarbons and combinations thereof.

The preferred oil phases are paraffin oils, low toxicity mineral oils, diesel oils, polyolefins, olefins and mixtures thereof.

Factors determining the oil to be used for a particular application include, but are not limited to, its cost and performance characteristics, environmental compatibility, toxicological profile and availability.

The invert emulsions of the present invention also comprise an aqueous phase that is at least partially immiscible in the oil phase. The aqueous phase is preferably the complement to 100% vol. of the oil phase and the other additives.

Suitable examples of aqueous phase include fresh water, sea water, salt water, brines (e.g. 25 wt % of CaCl2) in water or 12 wt % NaCl in water), glycerine, glycols, polyglycol amines, polyols and derivatives thereof, and combinations thereof.

Brines generally comprise water soluble salts. Suitable water soluble salts are sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and mixtures thereof. Suitable brines may include heavy brines.

Heavy brines, for the purposes of this application, include brines with various salts at variable concentrations that may be used to weight up a fluid.

The aqueous phase is chosen taking into account several factors including cost, environmental and health safety profile, density, availability, and which oil phase has been chosen. Another factor that may be considered is the application of the drilling fluid.

For example, if the application needs an emulsion with a heavy weight, a zinc bromide brine may be chosen.

As mentioned, oil-based drilling fluids are inverted emulsions. The inverted emulsions are generally stabilized by the addition of one or more emulsion stabilizing agents, also referred to as emulsifiers, which prevent the droplets coalescence, phase separations and, more in general, the reduction of their performances. Alternatively, emulsions can be stabilized using the approach discovered by Walter Ramsden (Proceedings of the Royal Society (London) B 72, 156-164 (1903)) and named after Pickering, who described the phenomenon in 1907, (Journal of the Chemical Society 91, 2001-2021).

When used in subterranean applications, emulsions undergo exceptional mechanical and thermal stress, and therefore stability is an especially critical aspect of their formulation.

For these reasons, the oil-based drilling fluids of the invention comprise from 0.1 to 4.0 g/100 ml, preferably from 0.25 to 1.7 g/100 ml, of at least one emulsifier, based on the total fluid volume.

The emulsifiers traditionally used in subterranean treatment fluids have surfactant-character, comprising a hydrophobic portion and a hydrophilic portion.

Typical examples of these emulsifiers are: calcium, magnesium and aluminium soaps of rosin acids and fatty acids, fatty acids, oxidized fatty acids, maleated fatty acids, polymerized fatty acids, fatty amines, fatty imidazolines and fatty (poly)amides.

Suitable fatty (poly)amides are obtained from the condensation fatty acids with (poly)amines. Examples of suitable fatty acids are $C_6$-$C_{30}$ unsaturated and saturated aliphatic monocarboxylic acids (or their esters), such as palmitoleic acid, oleic acid, linoleic acid, linolenic acid, arachidonic acid, decanoic acid, lauric acid, myristic acid, palmitic acid, stearic acid, behenic acid, and the like. Mixtures of $C_6$-$C_{30}$ saturated and unsaturated aliphatic monocarboxylic acids, such as fatty acids derived from natural oils, e.g. coconut oil, mustard seed oil, palm oil, olein, soybean oil, canola oil, tall oil, sunflower oil, and mixture thereof, can be also used.

Examples of (poly)amines are N-alkyl amines, alkanol amines, such as diethanol amine or diisopropanol amine, and polyalkylene polyamines, such as polyethylene polyamines, e.g. diethylene triamine, triethylene tetramine and tetraethylene pentamine.

Fatty polyaminoamides that are obtained from the condensation of fatty acids and di- or tri-carboxylic acids (or anhydrides thereof) with polyalkylene polyamines show remarkable emulsifying and dispersing properties and are useful in various applications where invert emulsions are formed. Fatty acids and polyalkylene polyamines useful for the preparation of these fatty polyaminoamides have been already mentioned above. Suitable di- or tri-carboxylic acids are fumaric acid, maleic acid (and its anhydride), succinic acid, citric acid and the like.

The monocarboxylic acids described above for the preparation of the polyamides are further examples of suitable emulsifiers. Aliphatic saturated and unsaturated monocarboxylic acids derived from tall oil and from the biodiesel production are particularly preferred.

Also fatty imidazolines obtained by condensation of fatty acids and polylakylene polyamines, such as those mentioned above, are emulsifier useful for the realization of the present invention.

Any oxidized or maleated or polymerized fatty acid commonly used in the field can be used as emulsifier for the realization of the present invention. Oxidized fatty acids are commonly prepared by passing (blowing) air, oxygen, ozonized air or ozone through the material, such as tall oil fatty acids or linseed oil fatty acids, under mildly elevated temperatures. Maleated fatty acids are readily prepared by methods well known in the art, which generally consist of heating approximately equivalent proportions of fatty acids and maleic anhydride at temperatures ranging from about 100 to 250° C. for periods ranging from several minutes up to several hours.

The polymerized fatty acids useful for the realization of the present invention may contain twenty-four or more carbon atoms and two or more carboxyl groups. Satisfactory acids of this type include the dimer and trimer fatty acids produced by polymerization (condensation) of unsaturated fatty acids according to one of the various procedures described in the art. Commercial polymerized fatty acids are usually mixtures which may contain extremely varying amounts of monomeric by-products, starting materials, as well higher polymeric acids along with dimer and trimer acids fatty acids.

The oil-based drilling fluids of the invention may further comprise conventional additives including weighting agents, wetting agents, fluid loss agents, rheology modifiers, lubricants, anti-oxidants, corrosion inhibitors, scale inhibitors, defoamers, biocides, pH modifiers, $H_2S$ scavenger, $O_2$ scavengers, and any other additive useful for the specific drilling operation.

Usually, weighting agents, such as $BaSO_4$ and/or $CaCO_3$, are required to provide the desired density of the fluid. The granulometry of the weighting agent is selected according to the requirements of the drilling operation. The fluid loss control additives can be selected from the family of modified natural occurring molecules and polymers and/or synthetic molecules and/or inorganic additives (e.g. minerals), gilsonite, asphalts, and more in general, any additives useful for reducing the loss of filtrate.

The wetting agents are used for wetting the solids within the drilling fluid. Such solid can be any solids dispersed in the fluid, such as the weighting agents and/or the drilling-cuttings. The wetting agent can be selected from the family of fatty acids and fatty acids derivatives.

The rheology modifiers can be selected from the family of organoclays (e.g. organophilic bentonite), styrene-butadiene-propylene co-polymers, polyacrylates, acrylic copolymers, vinyl toluene-acrylate copolymer resin, ester of trimer fatty acids and polyoxyethylene glycol and simple molecules, e.g. pyromellitamides.

In the most preferred embodiment, the anti-wear additive of the invention comprises:
a) from 30 to 50 wt % of one or more sulfated, sulfonated or sulfited natural oils or fats of vegetable or animal origin, or mixtures thereof;
b) from 30 to 55 wt %, of one or more solvents;
c) from 3 to 20 wt % of one or more non-ionic or anionic surfactants or mixture thereof.

Examples of suitable solvents include, without limitation, vegetable oils, diesel oils, hydrocarbons, paraffin oils, mineral oils, low toxicity mineral oils, olefins, esters, synthetic oils such as polyolefins, ethers, acetals, dialkyl carbonates, glycol ethers and polyols and combinations thereof. The preferred oils are paraffin oils, low toxicity mineral oils, mineral oils, vegetable oils, polyolefins, olefins, esters and mixtures thereof In a preferred embodiment, the anti-wearing additive of the invention comprises a low toxicity synthetic oils with low aromatics contents with biodegradability higher than 60%, according to the biodegradation test OECD 306.

Optionally, the anti-wear additive can comprise one or more non-ionic or anionic surfactants or mixtures thereof for improving the stability of the formulation.

Preferred non-ionic surfactants are sorbitan esters, fatty alkanolamides, fatty esters, ethoxylated fatty alcohol, ethoxylated phenols, ethoxylated and/or propoxylated nonylphenols, fatty amines, ethoxylated fatty amines, betaine and imidazolines.

Sorbitan monoleate, sorbitan monopalmitate, sorbitan monostearate, sorbitan trioleate are the preferred non-ionic surfactants.

Preferred anionic surfactants are phosphate esters of fatty alcohols, alkylethoxy citrates, sarcosinates and phosphoric esters of ethoxylated fatty alcohols. Phosphoric esters of ethoxylated fatty alcohols are the most preferred anionic surfactants.

Non-ionic or anionic surfactants, which are classified at least as "Yellow", Subcategory 1, or with a better rating according to the Norwegian classification scheme or as "Gold" within the CEFAS registration scheme, are preferred.

The anti-wear additive of the invention can also comprise from 1 to 10 wt % of at least one pour-point depressant such as glycol ethers, or polyols. Conventional methods can be used to prepare the oil-based drilling fluids. In one embodiment, an appropriate quantity of oil and emulsifiers are mixed together and the remaining components are added sequentially under continuous mixing.

An essential feature of the sulfated, sulfonated or sulfited natural oils and fats of vegetable or animal origin of the method of the invention is their moderate impact on the rheology and fluid loss of the oil-based drilling fluid.

Examples

In the examples the following chemicals were used:
Sulfited soybean oil (SSO), sodium salt, with an active substance content of about 80 wt % and an organic $SO_3$ content of 2.1% by weight.
Sulfated rapeseed oil (SRO), sodium salt, with an active substance content of about 80 wt % and an organic $SO_3$ content of 1.1% by weight.
Sorbirol O, sorbitan monooleate commercialized by Lamberti SpA, IT;
Sorbirol TO, sorbitan trioleate, commercialized by Lamberti SpA, IT;
Butyl triglycol ether (BTG);
Rolfen 10/12/490, ethoxylated fatty alcohol phosphate, commercialized by Lamberti SpA, IT;
Emulam PE, primary emulsifier, commercialized by Lamberti SpA, IT;
Emulam WA, wetting agent based on fatty acid derivatives, commercialized by Lamberti SpA, IT;
Emulam V Plus, organoclay, commercialized by Lamberti USA, USA;
Chimin P1, alkylether phosphate, with an active substance content of about 30 wt %, commercialized by Lamberti SpA, IT;
Emulube OBM, lubricant for oil-based drilling fluids, commercialized by Lamberti SpA, IT;
Ultralube II (E), lubricant for oil-based drilling fluids, commercialized by Integrity Industries INC;
EDC 95/11, hydrocarbons, $C_{15}$-$C_{20}$, n-alkanes, isoalkanes, cyclics, <0.03% aromatics, from Total SA, Fr;
Escaid 120, low aromatics/polycyclic aromatic hydrocarbons, commercialized by ExxonMobil Petroleum & Chemical B.V.B.A., Be.

Preparation of the Anti-Wear Additives

Anti-wear additives according to the invention were prepared by simply mixing the ingredients reported in Table 1 (as % by weight) using a mechanical stirrer.

TABLE 1

| Ingredients | Example 1 | Example 2 | Example 3 | Example 4 |
|---|---|---|---|---|
| SSO | | 40 | 33 | 46 |
| SRO | 45 | | | |

TABLE 1-continued

| Ingredients | Example 1 | Example 2 | Example 3 | Example 4 |
|---|---|---|---|---|
| Sorbirol O | 5 | | | |
| Sorbirol TO | | 7 | 33 | 6 |
| Rolfen 10/12/490 | | 6 | | |
| Escaid 120 | 45 | 47 | 34 | 48 |
| BTG | 5 | | | |

The additives of Table 1 are stable over a wide range of temperature (from −10° C. up to 80° C.) for more than one month. The pour point of the reported formulations is below 0° C.

Preparation of the Oil-Based Drilling Fluid

Oil-based drilling fluids were prepared using the raw materials reported in Table 2 (in g) using a Hamilton-Beach mixer. The raw materials were added in the same order as reported in Table 2, with the only exception of water and $CaCl_2$) that were mixed together and then added to the fluids. The commercial products Emulube OBM, Ultralube II (E) and, in particular, Chimin P1, a phosphate alkylether, were used as comparative anti-wear agents and lubricants.

An oil-based drilling fluid without anti-wear agents (Blank) was also prepared.

The final volume of all exemplified fluids was approximately 350 ml.

The fluids were then aged by hot rolling at 120° C. for 16 hours.

Rheological Characterization

The rheology measurements were performed at 50° C. according to API standard (API Recommended Practice 13I/ISO 10416:2008) using the OFITE Model 800 Viscosimeter.

Table 3 reports the most significant rheological parameters (in mPa*s) for the characterisation of the aged oil-based drilling fluids.

It shows that the Fluid 3 and 4 according to the invention show the same rheological behaviour of the Blank. This demonstrates that the anti-wear additives of the invention do not affect the rheology of oil-based drilling fluids. On the contrary, Ultralube II (E) heavily influences the rheology of the drilling fluids.

TABLE 2

| | Blank | Fluid 1* | Fluid 2* | Fluid 3 | Fluid 4 | Fluid 5 |
|---|---|---|---|---|---|---|
| EDC 95/11 | 160.0 | 160.0 | 160.0 | 160.0 | 160.0 | 160.0 |
| Emulam PE | 7.0 | 7.0 | 7.0 | 7.0 | 7.0 | 7.0 |
| Emulam WA | 1.0 | 1.0 | 1.0 | 1.0 | 1.0 | 1.0 |
| Emulam V PLUS | 9.0 | 9.0 | 9.0 | 9.0 | 9.0 | 9.0 |
| Lime | 7.0 | 7.0 | 7.0 | 7.0 | 7.0 | 7.0 |
| Gilsonite | 3.5 | 3.5 | 3.5 | 3.5 | 3.5 | 3.5 |
| Fresh water | 50.0 | 50.0 | 50.0 | 50.0 | 50.0 | 50.0 |
| $CaCl_2$ | 15.0 | 15.0 | 15.0 | 15.0 | 15.0 | 15.0 |
| $BaSO_4$ | 290.0 | 290.0 | 290.0 | 290.0 | 290.0 | 290.0 |
| $CaCO_3$ | 20.0 | 20.0 | 20.0 | 20.0 | 20.0 | 20.0 |
| Emulube OBM | | 10.5 | | | | |
| Ultralube II(E) | | | 10.5 | | | |
| Example 2 | | | | 10.5 | | |
| Example 4 | | | | | 10.5 | |
| Chimin P1 | | | | | | 10.5 |

*Comparative

TABLE 3

| | Blank | Fluid 1* | Fluid 2* | Fluid 3 | Fluid 4 | Fluid 5* |
|---|---|---|---|---|---|---|
| 600 RPM | 157 | 158 | 150 | 156 | 157 | 152 |
| 3 RPM | 7 | 7 | 14 | 7 | 7 | 6 |

TABLE 3-continued

| | Blank | Fluid 1* | Fluid 2* | Fluid 3 | Fluid 4 | Fluid 5* |
|---|---|---|---|---|---|---|
| PV | 68 | 69 | 60 | 68 | 68 | 63 |
| YP(lb/100 ft$_2$)** | 21 | 20 | 33 | 21 | 21 | 20 |

*Comparative
**1 lb/100 ft2 = 0.479 Pa

Fluid Loss Determination

The high-pressure high-temperature fluid loss measurements were carried out at 120° C. on the aged oil-based drilling fluids according to API standard (API Recommended Practice 13I/ISO 10416:2008) using the OFITE HTHP Filter Press. The results (in ml) are reported in Table 4.

TABLE 4

| | Blank | Fluid 1* | Fluid 2* | Fluid 3 | Fluid 4 | Fluid 5* |
|---|---|---|---|---|---|---|
| Fluid Loss | 1.6 | 1.6 | 1.5 | 1.6 | 1.6 | 1.7 |

*Comparative

The results of Table 4 confirm that the anti-wear additives of the invention do not affect the fluid loss of the drilling fluid.

Anti-Wear Performances

The wear-rate measurements were performed using a DUCOM TR-20LE pin-on-disk tribometer. A pin-on-disc tribometer consists of a stationary pin loaded against a rotating disc.

AISI 4140 steel pins and disks were used. The pins were of cylindrical shape with a height of about 30 mm and an area was about 7 mm$^2$.

The rotational speed of the discs was 30 Hz and the angular motion of the disk was 20°.

Each measurement was repeated three times.

The average wearing rate (WR) of pins and disks, expressed as $10^{-5}*mm^3/Nm$, as well as the percentage-reduction of wear (W %) in comparison to the Blank are reported in Table 5. In the same Table the average friction coefficient (ACoF) and the percentage reduction of friction (F %) are reported.

TABLE 5

| | WEAR | | | | FRICTION | |
|---|---|---|---|---|---|---|
| | Pin | | Disk | | | |
| | WR | W% | WR | W% | ACoF | F% |
| Blank | 5.0 | — | 4.0 | — | 0.085 | — |
| Fluid 1* | 5.0 | 0 | 4.1 | 0 | 0.080 | −5.9 |
| Fluid 2* | 4.3 | 14 | 3.6 | 10 | 0.079 | −7.0 |
| Fluid 3 | 2.7 | 46 | 2.7 | 33 | 0.077 | −9.4 |
| Fluid 4 | 2.7 | 46 | 2.6 | 34 | 0.074 | −11.8 |
| Fluid 5* | 3.9 | 22 | 3.2 | 20 | 0.083 | −2.3 |

*Comparative

The anti-wear additives of the invention provide significantly better anti-wear performance than commercial comparative products. In particular, the sulfated and sulfited oils of vegetable origin show better behaviour than an alkylether phosphate, a kind of compounds commonly used as anti-wear agents in water-based drilling muds. At the same time, the results of the friction coefficient demonstrate that they are also excellent lubricants and that they can guarantee/improve the lubricating performance of the oil-based drilling fluids which they are added to.

The invention claimed is:

1. A method comprising:
i) preparing an oil-based drilling fluid containing an external oil phase, an internal aqueous phase and an emulsifier;
ii) thereafter, adding to the oil-based drilling fluid an anti-wear additive comprising:
   a) from 25 to 65 wt % of sulfated, sulfonated or sulfited natural oils or fats, of vegetable or animal origin, or mixtures thereof;
   b) from 20 to 70 wt % of a solvent; and
   c) from 1 to 50 wt % of non-ionic or ionic surfactants, the amount of anti-wear additive being such that the final oil-based fluid contains between 0.1 and 4.0 g/100 ml of said sulfated, sulfonated or sulfited natural oils or fats based on the total fluid volume; and
iii) circulating the oil-based drilling fluid while drilling a subterranean well to minimize the weight loss of a mass from at least on of the drilling pipe or wellbore casing.

2. The method of claim 1, wherein the amount of anti-wear additive is such that the final oil-based fluid contains between 0.25 and 3.0 g/100 ml of the sulfated, sulfonated or sulfited natural oils or fats.

3. The method of claim 1, wherein the sulfated, sulfonated or sulfited natural oils or fats have an organic $SO_3$ content between 0.5 and 4.5% by weight, determined according to ASTM D1681-05.

4. The method of claim 1, wherein the sulfated, sulfonated or sulfited natural oils or fats are sulfited or sulfated natural oils or fats of vegetable or animal origin.

5. The method of claim 1 wherein the oil-based drilling fluid comprises from 30 to 95 percent in volume of the external oil phase based on the total volume of the fluid.

6. The method of claim 1 wherein the oil-based drilling fluid comprises from 0.1 to 4.0 g/100 ml of at least one emulsifier based the total volume of the fluid.

7. The method of claim 5 wherein the emulsifier is chosen from the group consisting of: calcium, magnesium and aluminium soaps of rosin acids and fatty acids, fatty acids, oxidized fatty acids, maleated fatty acids, fatty amines, fatty imidazolines and fatty (poly)amides.

* * * * *